United States Patent Office 3,711,542
Patented Jan. 16, 1973

3,711,542
N-METHYLOL PHOSPHAZENE COMPOUNDS
Edwin O. Hook, Marshfield, George R. Berbeco, Chestnut Hill, and Arthur S. Obermayer, West Newton, Mass., assignors to Moleculon Research Corporation, Cambridge, Mass.
No Drawing. Filed Dec. 18, 1969, Ser. No. 886,329
Int. Cl. C07d 105/02
U.S. Cl. 260—551 P        8 Claims

ABSTRACT OF THE DISCLOSURE

Phosphazene compounds containing N-methylol groups are prepared by reacting an amino phosphazene compound with formaldehyde in the presence of a base to provide a water-soluble N-methylol phosphazene compound. In particular, ansa and spiro-type ring N-methylol phosphazene compounds are prepared by reacting phosphonitrilic chloride with a $C_2$–$C_3$ alkylene diamine or ammonia plus glyoxal and reacting either product with formaldehyde in the presence of a base to form the N-methylol ring compound. The N-methylol phosphazene compounds are employed as fabric flame retardants and crease-proof monomers in condensation reactions with cellulosic-type fabrics.

BACKGROUND OF THE INVENTION

A number of phosphazene compounds have been prepared from phosphonitrilic chloride and bromide and some of these phosphazene compounds have been suggested for use in both solvent solution and emulsion form for the treatment of woven textile fabrics to impart or enhance the flame-retardant properties of the textile fabric so treated. A process for flameproofing textiles with a polyphosphonitrilic ester is disclosed in U.S. Patent 2,681,295, issued June 15, 1954, while the use of alkenyl phosphonitrilic esterpolyhalohydrocarbon adducts has also been suggested in textile treating liquids in U.S. Patent 2,825,718, issued Mar. 4, 1958. In the latter patent, the polyester adduct is employed in an emulsion form together with a free-radical reaction initiator to effect the polymerization of the alkenyl phosphazene compound.

The flameproofing of various cellulosic fibers has been described in French Patent 1,157,097 in which certain amino phosphazene compounds are employed in an aqueous solution. U.S. Patent 3,012,908, issued Dec. 12, 1961 describes certain phosphazene compounds prepared with methanol and ammonia and the use of the compounds in flameproofing cellulosic fibres. Further, U.S. Patent 3,193,571, issued July 6, 1965 describes an improved method of preparing various polymeric phosphonitrilic chlorides by reaction with ammonia and methanol which is reported to be useful in the treatment of cellulosic fibers. Trimers and tetramers of phosphazene compounds containing a variety of substituents including the amino, alkyl amino, aryl amino and other substituents are known. (See Chemical Engineering News, Apr. 22, 1968, "Phosphonitrilic Chemistry" by H. R. Allcock.). German publication Zeit. anorg. allgem. Chem. 322 (1963), pp. 239–241 discloses certain ansa and spiro-cyclic-alkylene-polyamine phosphazene compounds. Further, U.S. Patent 3,370,089 issued Feb. 20, 1968 discloses the preparation of certain triphenyl phosphazene compounds containing an N-methylol group for use in preparing high temperature condensation polymers.

SUMMARY OF THE INVENTION

Our invention concerns N-methylol phosphazene compounds, their method of preparation, their utility as flame retardants, crease-proofing monomers for fabrics and as cross-linking monomers for polymers and to the products and materials treated with such N-methylol phosphazene compounds. In particular, our invention relates to a novel class of water-soluble monomeric phosphazene compounds containing a plurality of N-methylol groups including ansa and spiro-ring N-methylol phosphazene compounds, to the use of such compounds alone, in solution and in precondensate liquors with other N-methylol compounds to treat cellulosic material such as woven fabrics and to the flame retardant and crease-proof materials prepared by such treatment.

The phosphazene compounds of our invention include without limitation those trimer and tetramer phosphazene compounds which contain at least one N-methylol group and particularly those compounds containing from about one to four N-methylol groups or those compounds where the nitrogen atoms of one or more of the N-methylol groups are part of a spiro or ansa ring. Such N-methylol phosphazene compounds include those wherein the nitrogen of the N-methylol group is directly linked to a phosphorus atom in the trimer or tetramer phosphazene ring, and where the other positions on the phosphazene ring are occupied by nonreactive or blocking groups or groups which impart an additional functional purpose to the N-methylol phosphazene compounds as hereinafter more particularly set forth. The nonreactive or blocking groups employed in our N-methylol phosphazene compounds are typically those prepared in a one-step reaction with the basic starting material such as, for example, replacing the chlorine radicals of the trimer and tetramer phosphonitrilic chloride with groups other than the N-methylolamino groups which do not react with the cellulosic materials treated by our compounds. A particular novel class of water-soluble phosphazene monomeric compounds of our invention include those trimers and tetramers and mixtures thereof containing a bridging ring, e.g., spiro, ansa or other cyclo or bridge compounds in which the ring or bridge contains at least one N-methylol group.

Our N-methylol phosphazene compounds are typically prepared by reacting a particular amino phosphazene compound with formaldehyde or a formaldehyde generating compound in the presence of a base in a water, alcohol or water-alcohol solution with the formation of the N-methylol phosphazene compound evidenced by an exotherm and the solubility of the resulting N-methylol compound with further dilution with water.

Our water-soluble monomeric N-methylol phosphazene compounds may be usefully employed as flame retardants and/or as crease-proofing monomers with cellulosic materials such as woven textile fabrics. Our N-methylol phosphazene compounds are directly bonded to the cellulosic materials such as textile fabrics, paper sheets and the like by reaction of the N-methylol groups with the cellulosic hydroxyl groups via a condensation reaction typically catalyzed by heat in the presence of an acid catalyst. Further, our N-methylol phosphazene compounds may be enhanced in bonding and reaction characteristics and in their utility as fire retardants and crease-proofing monomers by the incorporation in the N-methylol compound of polymerizable olefinic radicals as set forth more particularly in the copending U.S. patent application of the common assignee, U.S. Ser. No. 841,981, filed July 15, 1969, hereby incorporated by reference in its entirety.

Such phosphazene compounds may additionally be reacted with the cellulosic material via the double-bond groups through the use of chemical free-radical initiators or ionizing radiation, both to provide flame-retardant properties to the material and to act as a cross-linking agent to produce crease-resistant textile materials. Further, where our N-methylol phosphazene compounds include polymerizable olefinic radicals, such monomeric compounds have an additional functionality for reaction via chemical or free-radical initiation as a fire retardant and cross-linking monomer. It is common for both N-methylol and olefin to both be reactive, e.g., the common permanent press material, $CH_2=CHCONHCH_2OH$. Such monomeric compounds are used with chemical-free-radical initiation or via ionizing radiation to cross-link such polymers. Typical polymers include but are not limited to polyamide polymers such as the nylons and vinyl halide polymers such as polyvinyl chloride and vinyl chloride/vinyl acetate copolymers. The synergistic combination of the nitrogen and phosphorus in our compounds provides excellent flame-retardant properties to the polymer, while the vinyl-type functionality present provides an easy reaction to cross-link polymers for improved physical properties and enhanced heat stability; such as for example, in wire insulation. Accordingly, our N-methylol compounds may be employed alone or with other materials to treat cellulosic materials, or to treat or be an additive to various other polymers.

The N-methylol phosphazene compounds of our invention may be divided into several particular classes depending upon the primary utility of the compound. Generically, our N-methylol compounds correspond to the following structural formulae representing the trimer and tetramer structures. Our compounds will be designated more particularly in this application by reference to the trimer only and by the use of the formulae $(R)_n(P_3N_3)(R_1NCH_2OH)_{6-n}$ which designation will refer to the structural formula shown and include the tetramer and trimer plus tetramer mixtures:

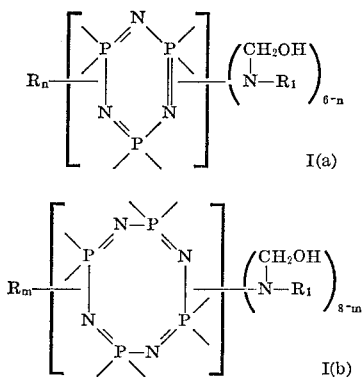

I(a)

I(b)

wherein R represents a monovalent organic radical, preferably one which can be incorporated into the phosphazene compound in a one-step reaction from the corresponding phosphonitrilic halide such as the chloride. Accordingly, R may represent a radical as follows:

(a) A halide radical like chloride, bromide, iodide or fluoride;

(b) An alkyl or cycloalkyl radical, saturated or unsaturated, particularly a lower alkyl radical such as a $C_1$–$C_4$ alkyl radical like methyl, ethyl, isopropyl and butyl;

(c) An alkoxy radical, saturated or unsaturated, particularly a lower alkoxy radical such as a $C_1$–$C_3$ alkoxy radical like methoxy, ethoxy and propoxy;

(d) An amino radical such as $NH_2$ or an aliphatic primary and secondary amino radical, particularly a lower alkyl amine radical such as $C_1$–$C_4$ mono and dialkyl amino radicals;

(e) A polymerizable olefinic radical such as a monovalent olefinic radical wherein the terminal carbon atom carries two hydrogen atoms and is bonded to the penultimate carbon atom by means of a double bond, and particularly allyl, methallyl, acryloxyethyl or methacryloxyethyl radicals;

(f) Phenyl radicals and alkyl-substituted phenyl radicals, particularly the lower alkyl-substituted phenyl radicals;

(g) An aryloxy radical, e.g., phenoxy including halogen or alkyl-substituted phenoxy; and (h) A divalent radical consisting of two R radicals taken together which form a divalent group such as $C_2$–$C_3$ alkylene, alkyleneoxy, alkylenedioxy, alkyleneamino or alkylenediamino, in which the group is bonded to one or more phosphorus atoms (ansa or spiro) to form a ring structure of 5 or more atoms or in which the divalent radical serves to connect two phosphazene rings.

$R_1$ represents monovalent and divalent radicals which are a member of the groups as follows:

(a) Hydrogen;

(b) An alkyl or cycloalkyl radical, saturated or unsaturated, particularly a lower alkyl radical such as the $C_1$–$C_4$ alkyl radicals;

(c) A polymerizable olefinic radical;

(d) A methylol or methylol-generating radical such as a methoxymethyl radical; and (e) Divalent alkyleneamino radicals, particularly divalent $C_2$–$C_3$ alkyleneamino radicals and their hydroxy substituted derivatives wherein the terminal end of the radical contains a nitrogen atom bonded to the same phosphorus atom as the nitrogen atom of the methylol group to form a spiro ring or to a different phosphorus atom of the same phosphazene ring to form an ansa ring or to the phosphorus atom of an adjoining phosphazene to form a bridged dimer compound, wherein the terminal nitrogen atom may contain a methylol group ($CH_2OH$), hydrogen, or lower alkyl radical. The integer $n$ represents one of the integers 0, 1, 2, 3, 4, or 5; and the integer $m$ represents one of the integers 0, 1, 2, 3, 4, 5, 6 or 7.

Where our N-methylol phosphazene compounds are to be employed primarily as a flame retardant in the treatment of cellulosic fabrics, alone or in combination with other crease-proofing monomeric compounds, it is preferred that $n$ represents an integer 3, 4 or 5, $m$ represents an integer 4, 5 or 6, R is an alkyoxy radical, chlorine or a mono or dialkylamino radical such as dimethylamino, diethyl amino, ethylmethylamino, dipropylamino, ethylpropylamino and the like, and $R_1$ is hydrogen or a lower alkyl radical. Typical N-methylol phosphazene compounds would include:

hexakis(N-methylol)(methylamino)cyclotriphosphazene;
hexakis(N-methylol)(ethylamino)cyclotriphosphazene;
tris(N-methylol)(amino)(methylamino)cyclotriphosphazene;
tris(N-methylol)(methylamino)(dimethylamino)cyclotriphosphazene;
bis(N-methylol)(amino)tetrakis(dimethylamino)cyclotriphosphazene;
bis(N-methylol)(methylamino)tetrakis(dimethylamino)cyclotriphosphazene;
tetrakis(N-methylol)(methylamino)bis(methoxy)cyclotriphosphazene;
tetrakis(N-methylol)(methylamino)bis(chloro)cyclotriphosphazene;
bis(N-methylol)(amino)tetrakis(dipropylamino)cyclotriphosphazene;
tris(N-methylol)(methylamino)(N-methyl-N-propylamino)cyclotriphosphazene;
tris(N-methylol)(methylamino)(phenyl)cyclotriphosphazene;
tris(N-methylol)(amino)(methyl)cyclotriphosphazene;
tetrakis(N-methylol)(methylamino)bis(phenoxy)cyclotriphosphazene; and
mono(N-methylol)(methylamino)bis(chloro)tris(dimethylamino)cyclotriphosphazene.

Our preferred N-methylol compounds are compatible and reactive with hydroxyl, amino or amido groups, particularly the hydroxyl groups of cellulosic materials. Where additional reactivity is desired, double bond groups may be incorporated into our phosphazene compounds to provide functionality as a cross-linking agent with other monomeric material or by themselves in the presence of free-radical initiators to produce, for example, a crease-resistant textile material. In such cases, $R_1$ may represent a polymerizable olefinic group such as more particularly an allyl or methallyl, acryloxyethyl or methacryloxyethyl group. Typical compounds will include:

hexakis(N-methylol)(allylamino)cyclotriphosphazene;
tetraskis(N-methylol)(methylamino)bis(allyloxy) cyclotriphosphazene;
bis(N-methylol)(allylamino)tetrakis(dimethylamino) cyclotriphosphazene;
tetrakis(N-methylol)(ethylamino)bis(allyloxyethoxy) cyclotriphosphazene;
tris(N-methylol)(propylamino)(methallyloxy) cyclotriphosphazene;
bis(N-methylol)tetrakis(methylamino)bis(acryloxy-ethoxy)cyclotriphosphazene;
tetrakis(N-methylol)(methylamino)bis(methallyl-amino)cyclotriphosphazene; and
bis(N-methylol)(methylamino)tetrakis(diallylamino) cyclotriphosphazene.

Where our N-methylol phosphazene compounds are employed as fire-retardant and cross-linking monomers in or with polymers nonreactive with an N-methylol group, then it is preferred that R represent a chlorine radical, an alkoxy radical, a phenoxy radical or a polymerizable olefinic radical and that at least two of the R or $R_1$ radicals represent polymerizable olefinic radicals such as allyl, methallyl, acryloxyethyl or methacryloxyethyl.

Typical organic polymers suitable for use with such phosphazene compounds or to which our phosphazene compounds may be added as flame retardants, etc., e.g., in amounts of 0.1 to 20% by weight, would include but not be limited to: polyamides such as synthetic linear polyamides like the nylons, polycarbonates, vinyl halide resins such as polyvinyl chloride and copolymers of vinyl chloride such as vinyl chloride/vinyl esters, polyvinylidene chloride and its copolymers, acrylic ester polymers, organic silicone polymers, polyurethanes, polyvinyl formals and butyrals, methacrylic polymers, styrene polymers, olefinic resins like polyethylene, polypropylene, ethylene-propylene copolymers, polyesters, as well as various natural and synthetic elastomers, acrylonitrile polymers and the like.

A novel class of N-methylol phosphazene compounds of our invention which, for example, have utility for the treatment of textile fabrics include those trimer and tetramer phosphazene compounds and mixtures thereof which include a heterocyclic-ring structure bearing an N-methylol radical such as the cyclo-ring of both ansa and spiro forms. The term spiro is used in this application in its known and accepted manner. The term ansa is generally less familiar and for the purposes of clarity, this appellation shall mean a ring structure completed across and including nonadjacent atoms in an existing ring structure as for example a ring structure, which represents the relationship which the handle (ansa ring) bears to the rim of a bucket (existing ring).

Typical single ring cyclic ansa and spiro structural formulas are as follows:

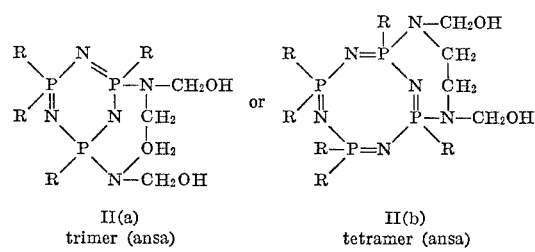

II(a) trimer (ansa)    II(b) tetramer (ansa)

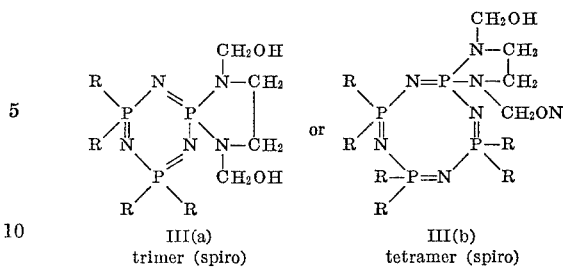

III(a) trimer (spiro)    III(b) tetramer (spiro)

Such cyclic compounds represents generally the $C_2$–$C_3$ alkylenediamino cyclotri and tetra N-methylol phosphazene compounds and their substituted derivatives as follows:

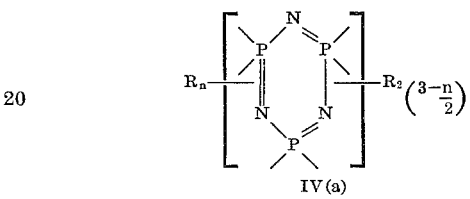

IV(a)

or

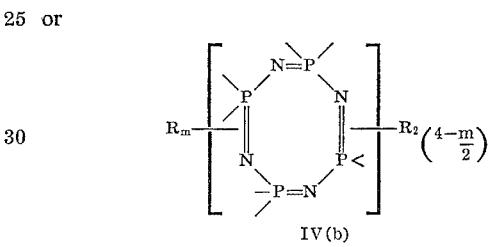

IV(b)

wherein $R_2$ is a heterocyclic polyalkylene or hydroxy-substituted alkylenediamino ring radical of the ansa or spiro type or mixture wherein the nitrogen atoms at each end of the ring are each bound directly to a single phosphorus atom (spiro form) or one each to different phosphorus atoms (ansa form), and $n$ is an integer of 0, 2, or 4 and $m$ is an integer of 0, 2, 4 or 6.

$R_2$ represents a divalent radical having a structural formula:

V wherein R' represents a lower alkylene divalent radical, saturated or unsaturated, which typically is a $C_2$ to $C_4$ alkylene radical, which may or may not contain one or more hydroxy, alkyl, or other substituents. The cyclo-ring phosphazene compounds of our invention include those for which $R_2$ represents the ethylene or propylenediamino radicals having one or two N-methylol groups. However, other compounds would include the ethylene and propylenediamino radicals wherein there are hydroxyl groups on the methylene groups.

Structural Formulas II and III are illustrative of certain such cyclo N-methylol structures; additional such structures may have one, two or three spiro rings if based on the trimer or one, two, three or four spiro rings if based on the tetramer. Steric considerations limit the number of ansa rings to one or two if based on the trimer, but ther are no such steric limitations on the tetramer which may have one, two, three or four ansa rings. It is understood that combinations of spiro and ansa rings may be included in a single phosphazene structure where sterically possible. Typical compounds include:

ansa(N,N'-dimethyloltrimethylenediamino)tetrakis (dimethylamino)cyclotriphosphazene;
ansa(N-methyl-N'-methyloltrimethylenediamino) tetrakis(diethylamino)cyclotriphosphazene;
ansa(N,N'-dimethylolethylenediamino)tetrakis (dimethylamino)cyclotriphosphazene;

ansa(N,N'-dimethylolethylenediamino)spiro(ethylenedioxy)bis(hydroxyethoxy)cyclotriphosphazene;
tetrakis(t-butylamino)spiro(N,N'-dimethylolethylenediamino)cyclotriphosphazene;
ansa(N,N'-dimethylol-1,2-dihydroxyethylenediamino) tetrakis(dimethylamino)cyclotriphosphazene;
ansa(N-methyl-N'-methyloltrimethylenediamino)spiro (trimethylenedioxy)bis(chloro)cyclotriphosphazene;
ansa(N,N'-dimethylolhexamethylenediamino)tetrakis (dimethylamino)cyclotriphosphazene;
ansa(N,N'-dimethyloltetramethylenediamino)tetrakis diethylamino)cyclotriphosphazene; and
ansa(N,N'-dimethylolethylenediamino)tetrakis (diallylamino)cyclotriphosphazene.

In another embodiment of our invention, the alkylenediamino radicals may also produce linear bridged structures as illustrated as follows:

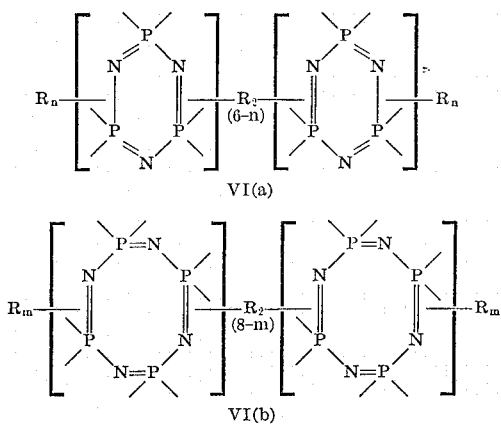

VI(a)

VI(b)

METHOD OF PREPARATION OF N-METHYLOL PHOSPHAZENE COMPOUNDS

Our N-methylol phosphazene compounds are prepared by reacting an aminophosphazene compound with formaldehyde or with a formaldehyde-yielding or generating compound, generally in an aqueous or alcohol or aqueous-alcohol solution, in the presence of a base such as to give a pH ranging from about 7.5 to 10, thereby substituting the hydrogen atoms bonded to the nitrogen atom with one or more methylol groups. The reaction may be carried out generally at a temperature of from about 40–80° C. with sufficient formaldehyde in either solid or liquid form to methylolate the desired number of amino radicals in the phosphazene compounds. Often the reaction mixture may be adjusted in pH to about 8 to 9.5 by the addition of an inorganic base such as alkali metal hydroxide such as sodium or potassium hydroxide. Formaldehyde may be employed as paraformaldehyde, trioxane, or as an aqueous formaldehyde solution. The mixture may be maintained at the reaction temperature from periods of from 30 minutes to 3 hours. Evidence of the reaction is generally by an exotherm with the subsequent solubilization of the phosphazene compound in the solution. Typically, the aminophosphazene compound is added to an aqueous mixture containing formaldehyde and the pH level adjusted to 8 to 9.5 and the temperature maintained at from about 45–60° C. The N-methylol phosphazene compound in the solution may be employed alone or in combination with other crease-proofing monomers in the treating of the cellulosic material. The N-methylol phosphazene compound may be concentrated or recovered by evaporating or distilling the solvent from the solution, preferably under reduced pressure, or the solution may be employed as such or in diluted form for the treatment of cellulosic materials.

METHOD OF TREATING CELLULOSIC MATERIALS

Our N-methylol phosphazene compounds may be employed for imparting improved properties to a variety of substrates and materials including but not limited to cellulosic materials such as fabrics or fibers, paper sheets and other cellulosic or hydroxy-containing material. The treatment of such materials confers or enhances various properties thereto including flame resistance, heat resistance, enhanced solvent resistance and deformation or crease resistance or a combination thereof. Such materials may be treated with one or more of our N-methylol phosphazene compounds either alone or in combination with other compounds such as other amino monomeric compounds subject to polymerization or condensation. Our N-methylol phosphazene compounds react through the N-methylol groups with the hydroxy groups, for example the hydroxy groups on the cellulose, by virtue of a condensation reaction to form methylene linkages similar in nature to the reaction of a phenol-formaldehyde novolak resin with hydroxy radicals. Further, where our N-methylol phosphazene compounds contain polymerizable olefinic radicals, reaction of such olefinic radicals with other monomeric polymerizable compounds may be accomplished.

Introduction of the phosphazene compound into films or fibers is accomplished by preparation of the films or fibers from bulk polymer containing the phosphazene or by sorption from the liquid phosphazene or a solution of the phosphazene in a suitable permeating or swelling solvent such as aqueous methanol or ethanol, dimethylsulfoxide, tetrahydrofuran, etc.

Introduction of the additive into bulk permeable materials such as wood or the like is accomplished by impregnation with phosphazene with or without first drying and/or evacuating the substrate material. Alternatively, the phosphazene compound can be dissolved in a suitable solvent and the solution employed to impregnate the wood in accordance with standard impregnation techniques such as placing the solution under pressure and including placing the wood or other bulk material in an air-tight chamber, evacuating the air from the chamber, and thereafter injecting the N-methylol phosphazene solution into the chamber.

The temperature at which the phosphazene compound is introduced is chosen to give an adequate rate of permeation, addition or blending without exceeding the degradation temperature of the phosphazene or substrate material.

Generally, where the treated substrate is to be cured by radiation, it is exposed to from 0.5 to 10 megarads or more of ionizing radiation, such as gamma radiation from cobalt-60 or energetic electrons from an accelerator such as a linear accelerator, Van de Graaf generator or other electron source. The irradiation can be performed in air, vacuum or an inert atmosphere such as nitrogen, though the use of air is detrimental to the final properties, particularly if irradiation is conducted over a period in excess of a few seconds.

While the substrate is often exposed to the ionizing radiation following treatment with the unsaturated N-methylol phosphazene, the substrate can also be exposed to the ionizing radiation prior to being treated with the unsaturated N-methylol phosphazene. Exposure of the substrate to the ionizing radiation produces free radicals in substrates such as the natural and synthetic polymeric materials. The radiation-induced free radicals react with the polymerizable olefinic radicals when the substrate is treated with the unsaturated phosphazene. It is often preferable to irradiate the substrate under an inert atmosphere or in a vacuum and to maintain the substrate in the inert atmosphere or an atmosphere from which the oxygen has been removed until the substrate is treated with the phosphazene. Optimum results are obtained if the unsaturated phosphazene is applied to the irradiated substrate within a few hours of irradiation. Longer periods between irradiation and treatment with the unsaturated phosphazene can be employed if the integrity of the inert atmosphere or vacuum is maintained, i.e., if the inert atmosphere or vacuum does not contain any species which will react with the radiation-induced free radicals. It is, however, difficult to maintain such a non-reactive environment for long periods; it is therefore recommended that the irradiated substrate be treated with the unsaturated phosphazene within a few hours of irradiation. The amount of phosphazene and methods of treatment are the same as previously discussed.

Where the N-methylol phosphazene compounds are employed in impregnating woven or non-woven fabrics or fibers, the textile fabric wet with the solution may suitably be cured by conventional textile or paper-curing procedures at temperatures ranging from about room temperature to the decomposition temperature of the textile, e.g., 20 to 160° C., for times ranging from a few minutes to several days, generally using the lower temperature with the longer times. Where tensile or tear strength of the flame-proof textile fabric or material is important the use of lower temperatures is often preferred.

Generally, immediately before use of the N-methylol phosphazene compound or a solution thereof to treat a cellulosic substrate, the compound or solution should be acidified by adding slowly with stirring an acid, for example a weak organic acid like acetic acid, to lower the pH of the solution to approximately 4.0 to 6.5, preferably 4.5 to 6.0. Typical acids suitable for use include both organic and inorganic acids and acid-generating compounds such as zinc salts like zinc nitrate, magnesium salts like magnesium chloride, etc. Our N-methylol phosphazene compounds react with cellulosic materials in a condenation reaction between the N-methylol groups and the hydroxyl groups in a typical and conventional manner by the application of heat, e.g., 40 to 200° C., generally in the presence of an acid catalyst. Accordingly, after treatment of the substrate containing the cellulosic hydroxyl groups or simultaneously therewith, the substrate may be treated with another solution containing the acid catalyst or the acid catalyst incorporated directly in the N-methylol phosphazene solution or the fabric or substrate pretreated with the acid catalyst and thereafter the N-methylol impregnated substrate heated to carry out the condensation reaction and to chemically bind the phosphazene compound to the substrate. The reaction may be carried out by employing temperatures of from 50 to 160° C. and employing a metal salt acid-type catalyst such as zinc or magnesium chloride or nitrate salts.

Where the N-methylol phosphazene compounds contain polymerizable olefinic groups so that a reaction may be carried out via the double-bond groups with the cellulosic material or polymers, then generally some means to polymerize must be used such as by initiating a free-radical reaction either chemically or by radiation. The unsaturated N-methylol phosphazene compounds employed may have a polymerization inhibitor added therein for storage purposes such as 0.05 to 1% of hydroquinone. However, just prior to use a free-radical initiator is generally added. Typical free-radical initiators would include a wide variety of peroxide, nitrile, azo and other compounds such as organic and inorganic peroxides like benzoyl peroxide, lauryl peroxide, tertiary butyl peroxide and nitrile compounds such as azodiisobutyronitrile and the like. These initiators may be employed alone or in conjunction with ionizing radiation or other compounds which by heat, irradiation or other means or techniques generate, produce, decompose to or otherwise provide free-radicals. Generally, these compounds are employed in amounts from about 0.01% to approximately 1% by weight of the phosphazene compound. These initiators may be added directly to the phosphazene compound or solution or may be employed in the polymer.

The processing of materials with such phosphazene compounds may involve a two-step process, with irradiation or chemical free-radical initiation followed by heat curing to achieve the N-methyol condensation reaction, or vice versa. For example, one such process would involve padding a cellulosic woven textile fabric in a padding bath containing the N-methylol phosphazene and latent acid catalyst, drying the fabric, heat curing at 25–160° C. to bind the phosphazene reactant to the fabric through the methylol group, and fabricating into a garment or piece goods, followed by irradiation to impart the desired crease-resistant properties. Alternatively, the treated and dried fabric or piece goods may be irradiated to bind the N-methylol phosphazene derivative to the fabric through its polymerizable olefinic groups, fabricated into a garment or piece goods, and subsequently heated to bring about cure through the methylol groups, thereby imparting desired crease-resistant and permanent press properties.

Our N-methylol phosphazene compounds may be employed as precondensates wherein the phosphazene compounds are employed in combination with other N-methylol or amino resin compounds now known. For example, a textile material or paper sheet or the like may be treated with a precondensate liquor consisting of our N-methylol phosphazene compound and an N-methylol amine such as a hexamethylolmelamine in a water or a water-alcohol solvent, wherein the phosphazene compounds may range from about 5 to 95%, for example, 10 to 60%, of the total methylol compounds. Typical compounds which may be included in a precondensate liquor with phosphazene compounds include those monomeric compounds commonly employed in permanent press resins such as amino and reactive amino compounds like phenol-formaldehyde novolak resins, melamine and melamine-urea resins, N-methylol melamine, N-methylol acrylamide, hexamethylenetetramine, urea-formaldehyde resins and the like.

Typical cellulosic materials and substrates which may be treated or reacted with our N-methylol phosphazene compounds include but are not limited to natural and synthetic materials, both organic or inorganic type, in sheet, fiber, particulate or any other form such as woven or nonwoven form. Some materials include wool, cotton, rayon, silk, jute, nylon and blends thereof. Other materials include paper, wood, sawdust, wood chips and cellulosic materials and polymers such as cellulose, regenerated cellulose, cellulose ethers, cellulose esters such as cellulose acetate and other polymers which contain reactive hydroxyl groups reactive with the N-methylol groups.

The cellulosic materials may be treated or reacted with our N-methyol phosphazene compounds by coating, blending into, adding to, padding onto, sorption by spraying, impregnating, dipping or otherwise treating, contacting or introducing or placing into contact with the substrate the desired amount of the N-methylol phosphazene compound. Typically the amount to be incorporated into a woven textile fabric may range from a 1 to 30% add-on to the fabric by weight; for example, 5 to 20%.

The amount of the N-methylol phosphazene compound to be employed and the treatment time depend upon the property desired to be imparted to the treated material as well as the number of N-methylol groups in the phosphazene compound and the other compounds employed. Typically the phosphazene compounds are applied or the fabrics are treated in a liquid carrier such as an aqueous, alcohol, or aqueous-alcohol solution. Suitable alcohols would include lower alkanols or solutions comprising an ester, ketone, amide, sulfoxide or a mixture thereof or the like. In such solutions, the phosphazene compounds may vary in weight from about 1 to 50% of the solution. Paper or other forms of cellulosic nonwoven sheet material may typically have the phosphazene compound employed by directly adding the compound into the head box or into the beaters or into the furnish or into other solutions for contact with the sheet prior to, during or after its formation.

The unsaturated N-methylol phosphazene compounds may in addition be introduced into noncellulosic-type polymers by any conventional method such as by coprecipitation, milling, extruding or mechanically blending of the material with the polymer: for example, by blending with pellets or powder of the polymer until uniform mixture is obtained.

METHODS AND MATERIALS USED

The substituted trimeric and tetrameric phosphonitrilic chlorides employed as starting materials in the present invention are known in the art and are produced by well known synthetic procedures wherein the phosphonitrilic chloride trimer ($N_3P_3Cl_6$) or the phosphonitrilic chloride tetramer ($N_4P_4Cl_8$) is reacted with an amine or hydroxy compound having at least one active hydrogen. The chlorine atoms attached to the ring phosphorous atoms are replaced either geminally or nongeminally by the R radicals which are linked through nitrogen or oxygen to the ring phosphorus, with the resultant production of HCl as a reaction by-product. The reaction between the phosphonitrilic chloride and the alkanol or alkylamine is carried out in an inert organic solvent or in an excess of the alkanol or alkylamine reactant as reaction medium and in the presence of a hydrogen chloride acceptor. The numberf of substituents added depends upon the solvent employed, the reaction temperature and the proportions of reactants employed. The various isomers formed are separable by standard chromatographic techniques such as liquid-phase chromatography and can be identified by analysis of their infrared and nuclear magnetic resonance spectra.

Detailed procedures for preparing and isolating the substituted trimeric and tetrameric phosphonitrilic starting materials of the present invention are to found in the following references:

U.S. Department of Agriculture Reports, Project Nos. UR–E29–(20)–35 and UR–E29–(20)55 by R. A. Shaw.

Shaw et al., JCS, (1966), 1677–1680.

Shaw, Record of Chemical Progress, 28:243 (December 1967).

Fitzsimmons et al., JCS (1964), 1635–1741.

Keat et al., JCS (1965), 2215–2223.

Das et al., JCS (1965), 5032–5036.

Ray, JCS (1963), 3236–3241.

Keat et al., JCS (1966), 908–913.

Becke-Goehring et al., "Zeitschrift fur anorganische und allgemeine Chemie" (1959), 103–119.

U.S. Pat. Nos. 2,681,295; 2,825,718; 3,113,129; 3,311,622; 3,197,464; 3,329,663; and 3,370,089. The teachings of these references concerning the preparation of various starting materials and materials and methods useful in this invention are expressly incorporated by reference.

SPECIFIC EMBODIMENTS

Example 1

(a) Ansa-ethylenediamino tetrachloro cyclotriphosphazene.—Phosphonitrilic chloride (67.4 grams) was dissolved in 500 ml. of anhydrous ethyl ether and ethylenediamine (23.3 grams) was added dropwise with stirring over about one-half hour. The mixture was then refluxed an additional hour. After cooling, the salt was collected on a filter, reslurried in ethyl ether and the slurry refiltered. The combined ethyl ether solutions were then evaporated, yielding 86% of theory of a white crystalline solid.

(b) Ansa-ethylenediamino tetrakis (dimethylamino) cyclotriphosphazene. — Excess dimethylamine (100 grams) was added to 66.5 grams of the product of Example 1(a), dissolved in 600 ml. of refluxing chloroform via a Dry-Ice condenser and the mixture refluxed for an additional two hours. The mixture was then cooled and stripped of chloroform in vacuo. The residue was taken up in 1000 ml. of hot light petroleum ether. On cooling, a product crystallized from solution and was collected on a filter and dried, yielding 75.4% of theory of a white crystalline solid.

(c) Ansa-N,N'-dimethylolethylenediamino tetrakis (dimethylamino) cyclotriphosphazene. — An Erlenmeyer flask was charged with 20.2 grams of a 37.5% formaldehyde solution in water and the solution was adjusted to a pH of 8 to 9 with aqueous sodium hydroxide. The product of 1(b) (30.0 grams) was added incrementally to the solution with stirring. The pH was checked regularly and adjusted with sodium hydroxide to the original level as required. The exothermic reaction carried the mixture to about 30° C. When the addition was complete, the mixture was heated to about 47 to 55° C. and held for one hour providing a clear solution containing the N-methylol phosphazene product. Immediately before use as a padding liquor on a cellulosic textile woven fabric, the solution was acidified slowly with stirring with a weak acid such as acetic acid to a pH of about 5.0.

Example 2

(a) Ansa - N - methyltrimethylenediamino tetrachloro cyclotriphosphazene.—The procedure of Example 1(a) was repeated except for the use of N-methylpropylene-1,3-diamine (66.0 grams) in place of the ethylenediamine and the use of double quantities of the phosphonitrilic chloride and diethyl ether. Stripping of the ether yielded substantially quantitative recovery of a white crystalline solid.

(b) Ansa-N-methyltrimethylenediamino tetrakis (dimethylamino) cyclotriphosphazene.—The procedure of Example 1(b) was repeated employing the product of Example 2(a) with excess dimethyl amine. Stripping of the chloroform under reduced pressure resulted in the quantitative recovery of a semi-solid product. On recrystallization from hexane, the product was obtained in crystalline form in approximately 90% of theory yield.

(c) Ansa - N-methylol-N'-methyltrimethylenediamino tetrakis (dimethylamino) cyclotriphosphazene.—The procedure of the example of 1(c) was repeated except that 60.0 grams of the product of Example 2(b) was used in place of the 30.0 grams of the product of Example 1(b).

Example 3

(a) Tetrakis(dimethylamino) bis(monomethylamino) cyclotriphosphazene.—To 800 ml. of chloroform in a three-neck round-bottom flask equipped with a stirrer and a "Dry-Ice" condenser, 90.72 grams of phosphonitrilic chloride was added. The solution was stirred until the phosphonitrilic chloride was dissolved and then heated to reflux. A mixture of chilled liquid amines (in excess) comprised of 200 grams of dimethyl amine and 69.5 grams of monomethyl amine was added very slowly. The solution was refluxed at 60° C. for 12 hours and allowed to stand overnight. The reaction product was distilled under reduced pressure to remove the chlorfrom, and the residue extracted with ethyl ether. Removal of the ether, finally in vacuo, yielded about 74 grams of white crystalline product.

(b) Tetrakis(dimethylamino) bis(N - methylol - N-methylamino) cyclotriphosphazene.—Based on the reactive amino groups in the phosphazene compound of Example 3(a), an Erlenmeyer flask was charged with one equivalent of an aqueous 37½% formaldehyde solution and the solution adjusted to a pH of approximately 8 to 9 with sodium hydroxide. The phosphazene compound of 3(a) was then added slowly with stirring while the pH was adjusted to maintain the original level. The N-methylolation reaction was evidenced by an exotherm and the solubilization of the aminophosphazene in the solution. After addition of all of the aminophosphazene, the mixture was maintained at a temperature of approximately 40–60° C. for a period of two hours and the solution then allowed to cool to room temperature. The solution contained the N-methylol derivative and had a pH of approximately 8 to 9.

Example 4

(a) Bis(dimethylamino) tetrakis(chloro) cyclotriphosphazene.—This compound is prepared by reacting phosphonitrilic chloride in ether solution with aqueous monomethylamine in a pressure vessel as described by Becke-Goehring, John, and Fluck, Zeit. anorg. und allgem. Chemie 302, pp. 114–15 (1959).

(b) Bis(dimethylamino) tetrakis(monomethylamino) cyclotriphosphazene.—The product of (a) is reacted with excess liquid monomethylamine at its boiling point as described in the above reference, p. 118.

(c) Tetrakis(N - methylol - N-methylamino) bis(dimethylamino) cyclotriphosphazene.—The product of (b) is treated with aqueous 37% formaldehyde as in Example 3(b) to yield the methylol derivative.

Example 5

(a) Tetrakis(dimethylamino) bis(chloro) cyclotriphosphazene.—Phosphonitrilic chloride, 185 gm., was dissolved in 650 ml. of dry ether in a round-bottom flask equipped with stirrer, thermometer, addition funnel and Dry-Ice condenser. A solution of 200 ml. of dimethylamine in 200 ml. of chilled ether (0–5° C.) was then added to the vigorously stirred solution as rapidly as was consistent with the ability of the Dry-Ice condenser to condense and prevent escape of dimethylamine. After addition was complete the mixture was stirred and heated at reflux for 4 hours. In order to maintain a slurry thin enough for adequate stirring, an additional 350 ml. of dry ether was added during the reflux period.

After settling overnight the mixture was filtered to remove amine hydrochloride. The filter cake was washed by reslurrying in ether, heating to reflux for ½ hour, cooling and refiltering. After drying in vacuo, 179 gm. of amine hydrochloride were recovered (theory 174 gm.). The combined filtrates were concentrated under reduced pressure to a volume of 250 ml. and chilled overnight. Filtration of the resulting slurry yielded 61 gm. of white crystals. An additional 52 gm. of identical material was recovered by further work-up of the mother liquor; total 113 gm. (54% of theory).

(b) Bis(allylamino) tetrakis(dimethylamino) cyclotriphosphazene.—To a solution of 38 gm. of the product of (a) in 200 ml. of toluene, contained in a 500-ml. three-necked round-bottom flask equipped with stirrer and reflux condenser was added 28 gm. of allylamine. The mixture was stirred and heated at reflux for 3 hours, during which time allylamine hydrochloride slowly precipated.

After standing overnight, water (ca. 200 ml.) was added to the mixture to dissolve amine hydrochloride and the excess amine. The aqueous layer was separated and the organic layer washed three times in a separatory funnel with small portions of cold water and dried over anhydrous $Na_2SO_4$. Solvent was removed by stripping to a pot temperature of 110° C. under 10 mm. pressure, yielding 32 gm. of pale yellow oil. On vacuum distillation, 19 gm. of product was recovered boiling between 160° and 170° C. at 0.1–0.5 mm.

(c) Bis(N-methylol-N-allylamino) tetrakis(dimethylamino) cyclotriphosphazene.—A 10-gm. sample of the product of (b) is treated with a 20% excess of aqueous 37% formaldehyde solution (based on the reactive —NH— groups) exactly as described under Example 3(b) above. The resulting aqueous solution contains the desired methylol derivative and is suitable for use in treating fabric.

Example 6

(a) Tetrakis(dimethylamino) bis(amino) cyclotriphosphazene.—The product of Example 5(a) is dissolved in tetrahydrofuran and added slowly to 4 equivalents of ammonia in five times its volume of tetrahydrofuran at 0–5° C. The solution is heated in an autoclave at 100° C. for three hours. After cooling, the autoclave is vented, the ammonium chloride is filtered off and the solvent removed by distillation to yield the product desired.

(b) Ansa-1,2-dihydroxethylenediamino tetrakis(dimethylamino) cyclotriphosphazene.—The reaction product of Example 6(a) dissolved in tetrahydrofuran is placed in a round-bottom flask, to which one equivalent of glyoxal as a 10% solution in tetrahydrofuran is added slowly with rapid stirring. The temperature is maintained at 80° C. for 8 hours. The product is isolated by stripping off the solvent.

(c) Ansa-N,N'-dimethylol - 1,2 - dihydroxethylenediamino)tetrakis (dimethylamino) cyclotriphosphazene.—The reaction product of Example 6(b) is reacted with formaldehyde in an analogous manner to that described in Example 3(b) to obtain the desired product.

Example 7

(a) Hexakis(allylamino) cyclotriphosphazene.—Phosphonitrilic chloride was dissolved in tetrahydrofuran and the solution then added dropwise with stirring to approximately 12½ equivalents of allylamine in approximately twice its volume of tetrahydrofuran. The addition was completed in approximately 1½ hours and the solution then refluxed for about 4 hours and permitted to stand overnight. The allylamine hydrochloride salt separates as a pale yellow oil when a large excess of allylamine is employed or as deliquescent colorless plates. The salt was removed by filtration and the filtrate evaporated to dryness. The resulting red tarry product was extracted repeatedly with refluxing light petroleum ether. The petroleum ether solution was then cooled to produce white crystals, which darkened rapidly on standing in air. The balance of the red-tar product was dissolved in acetone and approximately twice its volume of water was added, providing an additional 10–20% of theory of tan crystals.

(b) Hexakis(N-methylol-N-allylamino) cyclotriphosphazene.—The hexakis(allylamino) cyclotriphosphazene compound prepared as described in Example 7(a) was reacted with a formaldehyde solution as set forth more particularly in Example 3(b) to provide a solution containing the hexakis (N-methylol-N-allylamino) cyclotriphosphazene.

Example 8

(a) A double-hemmed cotton cloth (duck) was washed in a detergent solution of 3 g. Tide detergent in 2000 ml. tap water at 60–70° C. After rinsing in water, the cloth was dried, equilibrated at 57% relative humidity, and weighed. The cloth was then padded with a solution containing 25% hexakis(N-methylol-N-allylamino) cyclotriphosphazene (one dip, two nips). Just before the dipping, the solution was acidified slowly with acetic acid to a pH of about 7.5 and an acid catalyst added (Sun Chemical Company Catalyst X-4). The cloth was padded a second time, (one dip, one nip), dried at 90° C. for six hours, and then cured for 4 minutes at 121° C. The sample was washed in the detergent solution cited above, rinsed, again equilibrated at 57% relative humidity, and reweighed. The amount of compound add-on was approximately 25%, with the sample exhibiting a stiff hand, but no noticeable loss in tear strength. Also the cloth exhibited excellent crease resistance.

(b) The procedure of part (a) was repeated employing:

(1) Ansa-N,N-dimethylolethylenediamino tetrakis (dimethylamino) cyclotriphosphazene;

(2) Ansa-N-methylol - N' - methyltrimethylenediamino tetrakis(dimethylamino) cyclotriphosphazene; and (3) Mixed hexasubstituted N-methylolmonomethylamino dimethylamino cyclotriphosphazenes (with varying proportions of N-methylolmonomethylamino N,N-dimethylamino substituents).

The resin add-on to the cloth varied from 1.5 to 5.5% by weight of the sample. The hand of the cloth as well as the crease resistance was excellent.

(c) Examples 8(a) and (b) were repeated, but in this case employing a precondensate liquor composition consisting of approximately 50% by weight on a dry weight basis of the phosphazene compound of 8(b)(1) and 50% of hexamethylolmelamine. The treatment resulted in a 50% or greater resin add-on. The cloth was stiff, but exhibited good crease resistance.

Example 9

(a) Cotton print cloth (80 x 80) was treated as in Example 8(b)(1). The cloth was padded with a mixture comprised of 20 ml. of a ca. 25% solution of ansa-N,N'-dimethylolethylenediamino tetrakis(dimethylamino) cyclotriphosphazene and 5 ml. X–4 acid catalyst solution (available from Sun Chemical Corporation), dried, and cured as in Example 8(a) to achieve a 40% add-on. Strips (½" x 2") were cut from the cloth, mounted vertically and at a 45° angle and ignited with a match. The cloth burned very slowly when at a 45° angle, and in both cases left a large amount of black char. Control samples of the same print cloth (untreated) were ignited in an analogous manner. The untreated cloth burned very much more rapidly with the formation of a white ash.

(b) The procedure in Example 9(a) was repeated except that the padding mixture was composed of 10 ml. of a 25% solution of ansa-N,N'-dimethylolethylenediamino tetrakis(dimethylamino) cyclotriphosphazene, 10 ml. of a 25% hexamethylolmelamine solution, and 5 ml. of a 4 N solution of $NH_4Cl$. The resultant fabric had a weight add-on of 54%. The cloth was cut and ignited following the procedure of Example 9(a). The treated cloth burned slowly when in an upright position, but a strong, bulky char remained. When held at a 45° angle, the treated cloth ignited, but the fire extinguished after burning less than ¼ inch. The fabric was reignited and again the fire extinguished after burning less than ¼ inch up the cloth.

The above examples illustrate the preparation and use of some of the N-methylol phosphazene compounds of our invention.

Having thus described our invention, what we now claim is:

1. A cyclo ansa or spiro N-methylol phosphazene compound having one of the formulas:

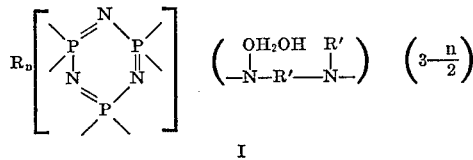

or

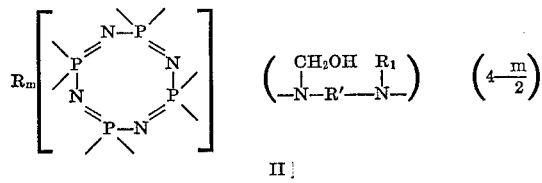

wherein
(a) R represents a member of the group of radicals consisting of:
  (i) a halide radical;
  (ii) a $C_1-C_4$ saturated alkyl radical;
  (iii) a $C_1-C_3$ saturated alkoxy radical;
  (iv) a $C_2-C_3$ alkylene dioxy divalent radical;
  (v) a hydroxy ethoxy radical;
  (vi) an amino radical;
  (vii) $C_1-C_4$ mono and dialkyl amino radicals;
  (viii) a polymerizable olefinic radical selected from the group consisting of acryloxyethyl, methacryloxyethyl, allyl or methallyl;
  (ix) an unsubstituted phenyl radical;
  (x) an unsubstituted phenoxy radical; and
  (xi) a $C_2-C_3$ alkylene diamino divalent radical which forms ansa and spiro rings.
(b) $R_1$ represents a member of the group consisting of:
  (i) hydrogen;
  (ii) a $C_1-C_4$ saturated alkyl radical;
  (iii) a methylol radical; and
  (iv) a polymerizable olefinic radical selected from the group consisting of acryloxyethyl, methacryloxyethyl, allyl or methallyl;
(c) R' represents a $C_2-C_3$ alkylene radical or a hydroxy-substituted $C_2-C_3$ alkylene radical wherein the nitrogen atoms of the divalent radicals are bonded to the same phosphorus atom to form a spiro ring, or to different phosphorus atoms of the same phosphazene ring to form an ansa ring, and wherein $n$ is 2 or 4 for an ansa compound and $n$ is 0, 2 or 4 for a spiro compound, and wherein $m$ is 0, 2, 4 or 6 and wherein divalent radicals of R are counted as two radicals.

2. A cyclic N-methylol phosphazene compound of claim 1 wherein $n$ is 4 or $m$ is 6, wherein $R_1$ is a methylol radical, R' is an ethylene or a propylene radical, and R is a chloride radical, a methoxy radical, a mono or dimethyl amino radical or an amino radical.

3. Ansa-N,N'-dimethylolethylenediamino tetrakis (dimethylamino) cyclotriphosphazene.

4. Ansa-N-methylol - N' - methyltrimethylenediamino tetrakis (dimethylamino) cyclotriphosphazene.

5. Ansa-N,N'-dimethylol - 1,2 - dihydroxyethylenediamino tetrakis (dimethylamino) cyclotriphosphazene.

6. Ansa(N,N' - dimethyloltrimethylenediamino) tetrakis (dimethylamino) cyclotriphosphazene.

7. Ansa(N,N' - dimethyloltetramethylenediamino) tetrakis (diethylamino) cyclotriphosphazene.

8. Ansa(N,N'-dimethylolethylenediamino) tetrakis (diallylamino) cyclotriphosphazene.

References Cited

UNITED STATES PATENTS 3,370,089   2/1968   Grushkin et al. _____ 260—551

HENRY R. JILES, Primary Examiner

H. I. MOATZ, Assistant Examiner

U.S. Cl. X.R.

106—168, 177; 117—57, 59, 60; 252—8.1; 260—45.9 R, 231 A, 232, 486 R, 543 P, 927 N